J. A. DICKSON.
COAL BREAKER.
No. 48,532.    Patented July 4, 1865.
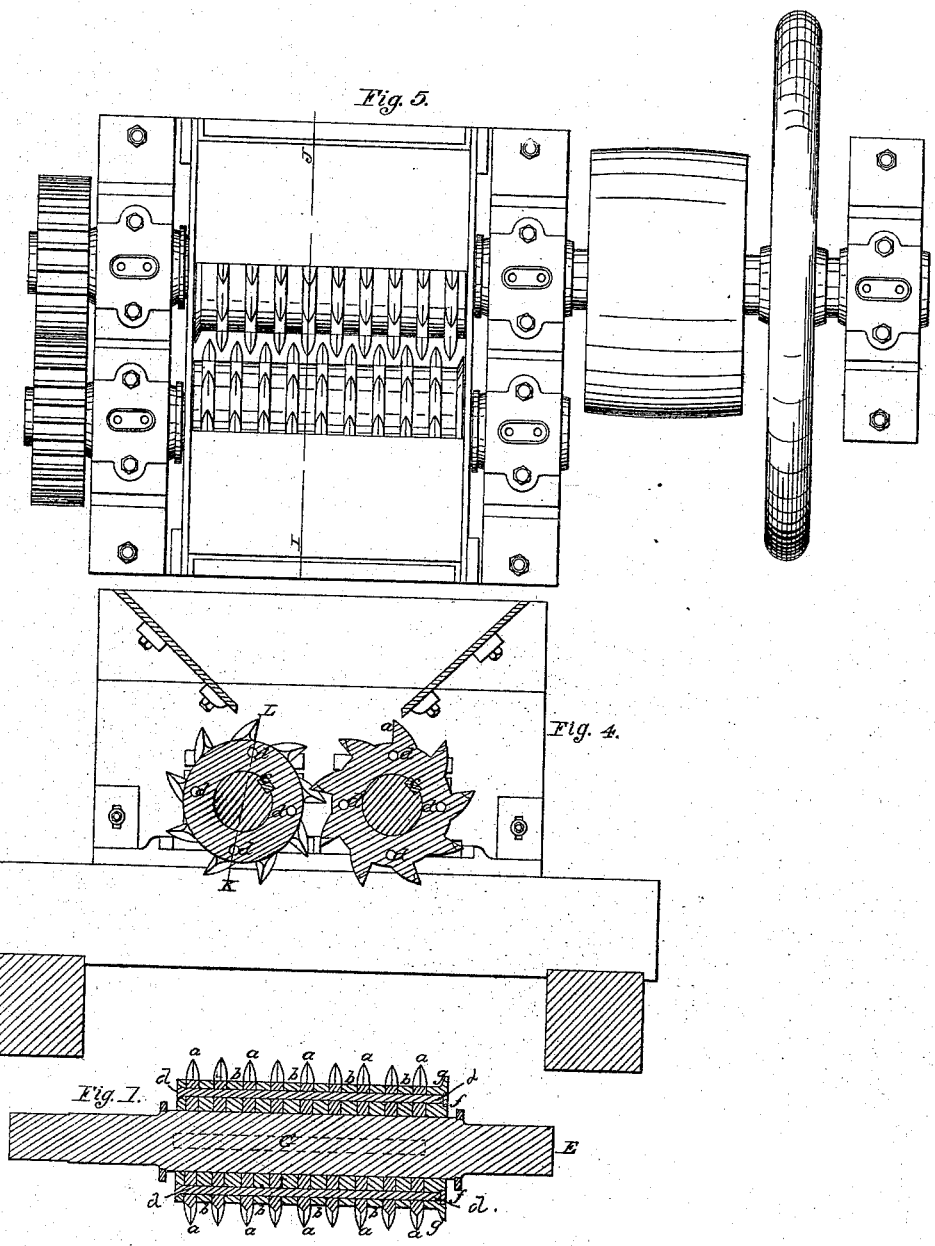
Witnesses:
Silas Leach
James Nolan
Inventor:
John A. Dickson

UNITED STATES PATENT OFFICE.

JOHN A. DICKSON, OF SCRANTON, PENNSYLVANIA.

COAL-BREAKER.

Specification forming part of Letters Patent No. 48,532, dated July 4, 1865.

*To all whom it may concern:*

Be it known that I, JOHN A. DICKSON, of Scranton, in the county of Luzerne and State of Pennsylvania, have invented a certain new and useful Improvement in the Construction of Machines used for Coal-Breakers; and I do hereby declare that the following is a full, clear, and exact description of the construction and operation of the same, reference being had to the annexed drawings, making a part of this specification.

Similar letters or figures of reference indicate corresponding parts in the different views presented.

In said drawings, Figure 1 represents a vertical section through the center of one of the rollers of the coal-breaker with its shaft. Fig. 2 represents a perspective view of the end of the same roller and shaft, and before the rings, with the teeth hereinafter mentioned, have been placed upon it. Fig. 3 represents a cross-section of one of the metallic rings, to be inserted between the wrought-iron or steel rings which have the teeth formed upon them, as hereinafter stated. Fig. 4 represents cross-sections of two of the rings which have the teeth formed upon them, showing, with the proper allowance for perspective, the position of the teeth when the rollers are ready for use.

Coal has long been broken by means of metallic rollers bearing teeth revolving from above toward each other with great rapidity, the teeth upon the one roller meshing or working into a corresponding space between the teeth on the other roller. The well-known Battin breaker operates in this manner. I do not claim as my invention the breaking of coal by such breakers as these; but in all such breakers the rollers and teeth, being made wholly or principally of cast-iron, have been found by experience to be very liable to injury or fracture, and when broken to be very difficult, if not insusceptible, of repair. The breaking of a few teeth, especially if near together, renders the rollers almost useless, as large masses of coal will then pass through quite unbroken. As the rollers, and frequently the teeth, are of cast-iron there is no possibility of repairing broken teeth; and even when the teeth have been made of wrought-iron, with or without tips or points of steel, and it has been sought to embed them in the cast-iron of the rollers by running the molten iron around them, the teeth are found, from the great strain upon them, to work loose in the rollers, while the temper of the steel of the points is injured or destroyed by the heat to which they are subjected in the process of casting so large a mass of molten iron as the body of the roller around them. All such breakers, when found to require repairs, are practically worthless. Being incapable of repair by welding they must be replaced by entirely new rollers as soon as they become unfit for use; and unless new rollers are, at great expense, kept ready for use in case of breakage, great delay and loss result, involving the stoppage of the works and perhaps the entire production of the mine.

My design is to construct rollers in such manner and of such materials as to be far less liable to fracture or injury of the teeth, and, in case of the fracture of the teeth, to admit of speedy and cheap repair, while permitting the use of teeth of steel or pointed with steel, or of iron case-hardened, which may always be kept sharp, so as truly to break the coal instead of crushing it between the dull or pointless teeth of the cast-iron rollers, either as the same are originally cast or as they soon become worn by the severe use to which they are subjected. I seek to carry out this design by constructing rollers which shall be mainly or wholly of wrought-iron or of steel, in which every row or series of teeth may be separately constructed, tempered, and, in case of necessity, repaired, but which, when put together, shall operate as a perfect whole, like the Battin or other breaker, only more perfectly, effectually, and cheaply.

My invention consists in constructing upon two or more metallic shafts designed to revolve in opposite directions rings of wrought-iron with teeth of wrought-iron, having steel points, or of wrought-iron alone, or of steel of the required shape and size, formed upon them, said rings being separated and adjusted by other metallic rings without teeth, and held in their places by suitable grooves and feathers and rivets or other devices, the whole being substantially as hereinafter described.

The two or more shafts, one of which is designated by the letter E, are to be of wrought or cast iron, of sufficient size for strength, and are to be driven in the usual manner. Upon each shaft wrought-iron or steel rings $a\ a$ are fitted, of the proper thickness and diameter, outside and inside, upon or out of which teeth are formed or welded of suitable length and shape—if of wrought-iron, pointed with steel and properly tempered, or made wholly of wrought-iron and case-hardened. The rings bearing the teeth are separated laterally upon the shaft at any required distances by other rings of metal, $b\ b$, and which may be either of wrought or cast iron or any other metal, of a suitable thickness to fill up the spaces between the first-mentioned rings, and placed alternately with them, as shown in the drawings. Each of these rings $a\ a$ and $b\ b$ is provided with a groove, C, of proper depth and width, formed to rest upon a feather, G, of corresponding thickness and height, rising out of the side of the shaft aforesaid, and extending along all that part of it upon which the rings are to be placed. All these rings are to be separately dressed up true and fitted to the shaft and feather in such a manner that any one of them will fit at any place on the shaft where they may be needed, and can be removed or renewed at pleasure. When in use these rings are fastened and held firmly in their position by bolts $d\ d$ passing through them on a line with the shaft, and secured by riveting the ends by nuts and screws or other appropriate means.

In the annexed drawings the elevations $f\ f$ represent collars that surround the ends of the shaft outside the hopper-plates, which plates are designed to keep the coal in place and force it through the rollers. These collars are made of wrought-iron and shrunk onto the shaft after it is turned.

Fig. 2 represents an end view of the shaft and fixtures, looking from the end E, and before the rings with the teeth have been placed upon it. The inner circles represent the thickness of the shaft at different points upon it. The outside line represents the outside of the rim, (marked $g\ g$,) as seen from the end E. It is cast fast to the shaft, and is designed to keep the coal in place, and also to hold the rivets, and thereby firmly bind the several parts together.

Fig. 3 represents one of the rings of cast or wrought iron, filling the spaces between the wrought rings bearing the teeth, and showing the rivet-holes $d\ d\ d\ d$ and the groove C, formed to rest upon the feather G, which rises out of the shaft E.

Fig. 4 represents cross-sections through different sets of teeth in the two rollers, when in place and ready to work, with portions of the hopper and of the frame which supports the rollers. This view, making allowance for the perspective, shows how the teeth of the respective rollers work or mesh together; also, the shape of the teeth, and how the steel is or may be applied when the teeth are made of iron and pointed with steel.

The breaker operates as follows: The rollers thus formed of the shafts, with their rings and other appurtenances, are made to revolve in opposite directions toward each other on the upper side, the several teeth of the one coinciding with and moving in the respective spaces between the teeth of the other, and thus breaking the coal in the usual manner, but with great economy as to waste and repairs. Moreover, by reason of the comparative smallness of the pieces on which the teeth are carried a perfect temper may be obtained for the teeth, which cannot be done on any of the breakers now in use. Much greater strength and firmness is also obtained in the teeth, the bodies of them being made of wrought-iron and welded to or formed out of the body of the rings on which they rest, or the rings and teeth being each of one solid piece of steel, they cannot be detached by any substance coming in contact with them. The ordinary cast-iron teeth are easily broken, and when wrought-iron teeth are used, with or without steel points, and embedded in cast-iron, the junction can never be made perfect, and the teeth are always likely to become loose or to be knocked out.

The accompanying drawings and the foregoing specification are designed to represent and describe my invention as applied to a breaker substantially like that known as the "Battin breaker;" but my invention is intended to apply and extend to the construction of all breakers by means whereof coal is broken by revolving wheels with teeth formed upon them, whether the same operate in the manner usually known as the "Battin breaker," or in any other or whatsoever manner.

What I claim as my invention, and desire to secure by Letters Patent, is—

The construction of rings bearing teeth separated from each other by rings without teeth, as above described, and for the purposes herein pointed out.

J. A. DICKSON.

Witnesses:
S. SHERRER,
SILAS LEACH.